United States Patent Office 3,000,926
Patented Sept. 19, 1961

---

3,000,926
PREPARATION OF ALKYL BORATE ESTERS
Allen L. McCloskey, Orange, and Lowell L. Petterson, Whittier, Calif., assignors to United States Borax & Chemical Corporation, Los Angeles, Calif., a corporation of Nevada
No Drawing. Filed June 23, 1958, Ser. No. 743,984
7 Claims. (Cl. 260—462)

This invention relates as indicated to the preparation of alkyl borate esters and has more particular reference to the direct production of substantially pure alkyl borate esters.

The preparation of trialkyl borate azeotropes from boron trifluoride etherate and sodium methoxide is well known to those skilled in the art, United States Patent 2,739,979 is illustrative of such process. However, it is of the utmost importance to note that all such prior art including the above mentioned patent teach the preparation of the ester only as the azeotrope. Thus the recovery of the trialkyl borate as a substantially pure ester necessitates further complicated processes to separate the ester from its azeotrope.

In the prior art production of alkyl borate esters, for example trimethyl borate, boron trifluoride diethyl etherate is mixed with a methanol solution of sodium methoxide. The reaction proceeds as shown in the following equation:

$$BF_3(C_2H_5)_2O + 3NaOCH_3 + CH_3OH \rightarrow [B(OCH_3)_3 + CH_3OH] + 3NaF + (C_2H_5)_2O$$

(The brackets [ ] indicate trimethyl borate-methyl alcohol azeotrope.)

The present invention is predicated upon the discovery that by reacting boron trifluoride etherate with an alkali alkoxide in the presence of an inert solvent, substantially pure trialkyl borate ester is produced. Thus the need for separating the ester from its azeotrope is completely eliminated.

It is therefore the principal object of this invention to provide a process by which substantially pure alkyl borate esters are produced directly.

It is a further object of this invention to produce substantially pure alkyl borate esters enriched in the $B^{10}$-isotope from the available $B^{10}$-enriched $BF_3$-complexes.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the ways in which the principle of the invention may be employed.

Broadly stated, the present invention comprises the method for directly producing substantially pure alkyl borate esters which comprises mixing boron trifluoride etherate with an alkali alkoxide in the presence of an inert non-azeotroping solvent, the alkyl group of said alkoxide having a maximum of three carbon atoms, said solvent and said ester having a boiling point differential of at least about 20° C., and heating said mixture to form said ester.

From the foregoing broadly stated paragraph it will be seen that the reaction of the present process, for example, proceeds according to the following equation:

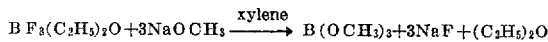

While the above equation illustrates the formation of trimethyl borate the use of other alkali alkoxides will produce other alkyl esters. Thus alkali ethoxide and alkali propoxide will produce their corresponding esters. As for the solvent, any solvent which is non-reactive with the boron trifluoride etherate and alkali alkoxide and has a boiling point differential of at least about 20° C. with the ester being formed is applicable to the present process. If trimethyl borate is being produced a solvent having a boiling point of at least about 20° higher or 20° lower than trimethyl borate could be used in the reaction. Since the boiling points of trimethyl borate, triethyl borate and the tripropyl borates are well known, the choice of a solvent is simple. Thus such solvents are xylene, toluene, benzene, cyclohexane, n-decane, and pentane are typical of many which would be found useful in the present process.

If the solvent used has a boiling point lower than the boiling point of the ester being formed then the reaction would be carried out under reflux at the boiling temperature of the solvent. When the reaction is completed then, of course, the solvent would be distilled and the ester would remain in the pot. In a continuous operation for the production of the esters a solvent having a boiling point higher than the ester would be preferred, since this method would lend itself to the continuous removal of product and continuous addition of necessary ingredients; however, in either case the important factor being the temperature differential so that the ester can be readily separated from the solvent.

The following is an example of the present process and is given for illustrative purposes:

*Example*

A one liter, three-necked round-bottomed flask equipped with stirring motor, pressure equalizing dropping funnel and an 18" packed distillation column was used to prepare trimethyl borate esters.

Boron trifluoride etherate (1 mole) was added to a slurry of sodium methoxide (3 moles) in 500 ml. of xylene at about 21° C. The reaction mixture was heated to about 70° C. at which temperature the ether was distilled. The residue was then distilled to give a 52% yield of substantially pure trimethyl borate. The product on analysis showed a boron content of 10.45%, the theoretical boron content being 10.41%.

Using the process of this invention it becomes a simple matter to produce alkyl borate esters enriched in the $B^{10}$-isotope. By reacting available $B^{10}$-enriched $BF_3$-complexes with an alkali alkoxide exactly as described, the $B^{10}$-enriched ester is formed.

Thus we have provided a process for directly producing substantially pure alkyl borate esters and substantially pure $B^{10}$-isotope enriched alkyl borate esters without having to first produce an azeotropic mixture and then separating the ester from the azeotrope.

Other modes of applying the principle of the invention may be employed, change being made as regards the details described, provided the features stated in any of the following claims or the equivalent of such be employed.

We, therefore, particularly point out and distinctly claim as our invention:

1. The method of directly producing substantially pure alkyl borate esters which comprises mixing boron trifluoride diethyl etherate with an alkali alkoxide in the presence of a hydrocarbon solvent inert to said etherate and said alkoxide and having a boiling point in the range of from about 35 to about 200° C., the alkyl group of said alkoxide having a maximum of three carbon atoms, said solvent and said borate ester having a boiling point differential of at least about 20° C., and heating said mixture to form said borate ester.

2. The method of directly producing substantially pure alkyl borate esters which comprises mixing boron trifluoride diethyl etherate with an alkali alkoxide in the presence of a hydrocarbon solvent inert to said etherate and said alkoxide and having a boiling point in the range of from about 35 to about 200° C., the alkyl group of said alkoxide having a maximum of three carbon atoms, said solvent and said borate ester having a boiling point differential of at least about 20° C., heating said mixture to form said ester and separating said ester from said solvent.

3. The method of claim 2 which comprises fractionally distilling said borate ester from said mixture.

4. The method of claim 2 wherein the boron trifluoride diethyl etherate is enriched in $B^{10}$ isotope.

5. The method of directly producing substantially pure trimethyl borate which comprises mixing boron trifluoride diethyl etherate and sodium methoxide in the presence of a hydrocarbon solvent inert to said etherate and said methoxide, and having a boiling point in the range of from about 35 to about 200° C., said solvent and said trimethyl borate having a boiling point differential of at least about 20° C., heating said mixture to form trimethyl borate and separating said trimethyl borate and the solvent.

6. The method of directly producing substantially pure triethyl borate which comprises mixing boron trifluoride diethyl etherate and sodium ethoxide in the presence of a hydrocarbon solvent inert to said etherate and said ethoxide, and having a boiling point in the range of from about 35 to about 200° C., said solvent and said triethyl borate having a boiling point differential of at least about 20° C., heating said mixture to form triethyl borate and separating said triethyl borate and the solvent.

7. The method of directly producing substantially pure tripropyl borate which comprises mixing boron trifluoride diethyl etherate and sodium propoxide in the presence of a hydrocarbon solvent inert to said etherate and said propoxide, and having a boiling point in the range of from about 35 to about 200° C., said solvent and said tripropyl borate having a boiling point differential of at least about 20° C., heating said mixture to form tripropyl borate and separating said tripropyl borate and the solvent.

References Cited in the file of this patent

UNITED STATES PATENTS

| 2,262,187 | Lytle et al. | Nov. 11, 1941 |
| 2,739,979 | Barnes et al. | Mar. 27, 1956 |

OTHER REFERENCES

Anal. Chem. 19, 544 (1947).

Schecter et al.: Boron Hydrides and Related Compounds, May 1954, ASTIA, pp. 124 and 133.